(12) United States Patent
Kang et al.

(10) Patent No.: US 8,716,633 B2
(45) Date of Patent: May 6, 2014

(54) METHOD FOR MANUFACTURING PTC DEVICE AND SYSTEM FOR PREVENTING OVERHEATING OF PLANAR HEATERS USING THE SAME

(75) Inventors: Suk-Hwan Kang, Daejeon (KR); Mun-Han Kim, Daejeon (KR)

(73) Assignee: Uniplatek Co., Ltd., Daejeon (KR)

( * ) Notice: Subject to any disclaimer, the term of this patent is extended or adjusted under 35 U.S.C. 154(b) by 101 days.

(21) Appl. No.: 12/872,874

(22) Filed: Aug. 31, 2010

(65) Prior Publication Data

US 2011/0084060 A1 Apr. 14, 2011

(30) Foreign Application Priority Data

Oct. 13, 2009 (KR) .................. 10-2009-0097072
Feb. 10, 2010 (KR) .................. 10-2010-0013692

(51) Int. Cl.
*H05B 1/02* (2006.01)
(52) U.S. Cl.
USPC ...................................... 219/494; 156/275.5
(58) Field of Classification Search
USPC ........... 219/494, 495, 482; 156/275.5; 29/612
See application file for complete search history.

(56) References Cited

U.S. PATENT DOCUMENTS

| | | | | |
|---|---|---|---|---|
| 4,318,881 | A * | 3/1982 | Sopory ........................ | 264/346 |
| 6,481,094 | B1 * | 11/2002 | Ikeda et al. .................... | 29/612 |
| 2005/0035334 | A1 * | 2/2005 | Korzhenko et al. ........... | 252/500 |
| 2005/0092735 | A1 * | 5/2005 | Merk et al. .................... | 219/494 |
| 2009/0110924 | A1 * | 4/2009 | Inoue et al. ................... | 428/345 |
| 2009/0206980 | A1 * | 8/2009 | Yamashita .................. | 338/22 R |

FOREIGN PATENT DOCUMENTS

| | | |
|---|---|---|
| KR | 2000-0075344 A | 12/2000 |
| KR | 10-0490942 | 5/2005 |
| KR | 10-0497919 | 6/2005 |
| KR | 10-0697919 | 3/2007 |

\* cited by examiner

*Primary Examiner* — Julio J Maldonado
*Assistant Examiner* — Robert Bachner
(74) *Attorney, Agent, or Firm* — Knobbe Martens Olson & Bear LLP (57) ABSTRACT

Disclosed are a method for manufacturing a positive temperature coefficient (PTC) device and a system for preventing overheating of a planar heater using the same. The manufacturing of the positive temperature coefficient (PTC) device is performed by mixing one or more polymer resins selected from ethylene butyl acrylate copolymers, ethylene vinyl acetate copolymers and polyethylene oxide, carbon black and an additive to prepare a compounding composition, adhering an electrode to both surfaces of the compounding composition, compressing the resulting electrode structure into a sheet, and irradiating electron beams to the sheet to perform cross-linking. Also, disclosed is a planar heater overheating prevention sensor cable obtained by connecting a plurality of PTC devices in series and adhering the devices to the surface of a planar heater by a predetermined distance. The PTC overheating prevention sensor cable is bent in one direction and adhered to a region in which a planar heater is arranged, thus having a structure in which the PTC devices are randomly dispersed in the form of a dot. The system for preventing overheating of a planar heater controls electric current transfer of the planar heater, when overheating occurs in or around the region in which PCT devices are adhered due to abnormal operation and thus prevents the overheating, thereby exhibiting improved safety, high installment and construction efficiency, decreased energy loss and superior durability.

9 Claims, 10 Drawing Sheets

METHOD FOR MANUFACTURING PTC DEVICE AND SYSTEM FOR PREVENTING OVERHEATING OF PLANAR HEATERS USING THE SAME

CROSS-REFERENCE TO RELATED APPLICATIONS

This application claims priority under 35 U.S.C. §119 to Korean patent application no. KR 10-2009-0097072, filed on Oct. 13, 2009, and to Korean patent application no. KR 10-2010-0013692, filed on Feb. 10, 2010, each of which is incorporated herein by reference in its entirety.

BACKGROUND

1. Field

The present technology generally relates to a method for manufacturing a positive temperature coefficient (PTC) device and a system for preventing overheating of a planar heater using the same, wherein a plurality of PTC devices are connected in series and are thus used as an overheating prevention sensor of a planar heater controller to control electric-current transfer of the planar heaters, when over-heating (or heat storage) occurs, to improve safety of the planar heaters.

2. Description of the Related Art

Most flooring heating and other heating systems to date have generally used fossil fuels such as oils and gases, thus entailing serious problems such as exhaustion of fossil fuels as well as environmental pollution caused by toxic gases generated upon incomplete combustion. For this reason, heating systems using alternative energy are attracting much attention, and research and development thereof have been continued. As a result, electric heating appliances using electricity instead of fossil fuels were developed and are commonly used. However, heat-generation using electricity developed to date mainly uses local heating caused by heating resistors, arcs or induction heating, or one-dimensional linear heating. These heat-generation methods disadvantageously involve concentration of heat only around a heating source, thus requiring homogeneous heat-generation throughout wide two-dimensional plains in view of the efficiency. As a result of a great deal of research for novel heating sources, planar heaters have thus been developed.

A planar heater generates heat, based on an electric current applied to thin-film electrodes, which are inserted into both terminals thereof, and inherent resistance of a material thereof. The planar heater is applied to various shapes of heating systems (heating systems for floors, walls, cells, etc.) and industrial heater components, and thus attracts much attention as next-generation heating source for heating systems which enable homogeneous heat-generation throughout wide two-dimensional planes owing to superior flexibility. Thus, such heaters realize economical and friendly-environmental effects by replacing fossil fuels.

The most generally used temperature-control manner for planar heating is electricity control using a temperature sensor. The principle of this manner is to control heat-generation, based on the temperature displayed on a temperature-sensor mounted on the surface of a heater. When a planar heater is applied to floor heating systems, heaters most generally control temperature based on the temperature measured using a temperature sensor (such as thermistors or bimetals) adhered to the surface of a heater.

One problem with this temperature-control method relates to control of the overall temperature throughout the system, based on the temperature around the sensor. This problem is negligible, when the overall surface maintains a predetermined temperature, but a predetermined part except for the sensor stores (or collects) heat and requires caution of users in order to prevent damage to finishing materials and products. An example of damage to finishing materials and deterioration in product performance caused by heat storage (heat accumulation) will be illustrated. In ordinary life, blankets, cushions and materials for blocking heat in the air are exposed to a region spaced from sensors for controlling temperature for a long time, thus disadvantageously causing rapid elevation in temperature, as compared to a control temperature and then damage to finishing materials and deterioration in product performance.

That is, the heater is controlled by measuring only a region in which the temperature sensor is arranged, thus causing the difference in temperature between a region close to the temperature sensor and a region far therefrom depending on the external heat-insulation level and the surrounding temperature, and requiring care of users such as unlimited generation of heat from the heater. More specifically, when blankets, cushions and materials for blocking heat are placed in absence of temperature sensors for a long time, the temperature is rapidly elevated, as compared to a control temperature, and finishing materials may be damaged or product performance may be deteriorated.

In order to solve these problems, it is preferable to prevent excessive elevation in temperature by controlling the temperature throughout the planar heater.

Conventional multichannel temperature sensing methods have a limitation of system development and construction. For multichannel temperature sensing methods, it is not easy to control temperature of a wide area, based on data received from respective channels. When one of a plurality of temperature sensors operates abnormally, it may affect the overall system, thus causing difficulty in finding optimum heating conditions and considerably lowering practical applicability. Also, this method has the disadvantage of complicated structures of heating systems, thus making it difficult to install and construct, and causing an increase in construction costs.

In addition, positive temperature coefficient (PTC) heaters (positive temperature heating elements) are mostly small heaters having a narrow electrode gap and PTC heaters for heating are generally applied to ultra-small areas of constructions, but are relatively expensive and are generally limited to low-voltage products. This is the reason that products may be readily damaged due to deterioration of PTC heaters and thus limited reproduction of PTC performance, when a high voltage (AC 100V or higher) is repeatedly applied in order to heat PTC heaters.

SUMMARY OF CERTAIN INVENTIVE ASPECTS

Therefore, some embodiments of the present technology have been made in view of the above problems, and it is one object of some embodiments of the present technology to provide a system for preventing overheating of a planar heater which can prevent partial overheating (or heat-generation) therein by connecting a plurality of PTC devices suitable for use in overheating prevention sensors, in series and adhering the devices on the surface of a heater, such that the devices are spaced from one another by a predetermined distance, and exhibit superior durability and construction efficiency and improved safety, and a method for operating the same.

Some embodiments relate, for example, to methods for manufacturing a positive temperature coefficient (PTC) device. The methods can include, for example, mixing one or more polymer resins, including for example, one or more of ethylene butyl acrylate copolymers, ethylene vinyl acetate copolymers and polyethylene oxide; carbon black having a mean particle diameter of 70 to 300 nm; and an additive to prepare a compounding composition; adhering an electrode to both surfaces of the compounding composition and compressing the resulting electrode structure into a sheet; and irradiating electron beams to the sheet to perform cross-linking.

In some non-limiting aspects, the compounding composition can include, for example, one or more of the polymer resin of 20 to 70 wt %, the carbon black of 30 to 80 wt % and the additive of 0.1 to 3 wt %. In some non-limiting aspects, the additive can be for example, a mixture that includes one or more of an antioxidant, a UV stabilizer and a cross-linking agent. In some non-limiting aspects, the sheet formed into the electrode may have, for example, a thickness of 0.2 to 3 mm. In some non-limiting aspects, the electron beam cross-linking process may be, for example, carried out at 5 to 320 keV. The methods for manufacturing a positive temperature coefficient (PTC) device further can include, for example, annealing after cross-linking or manufacturing the overheating prevention sensor cable.

Some embodiments relate to planar heater overheating prevention sensor cables obtained by connecting a plurality of PTC devices manufactured by the methods described in the preceding paragraphs or elsewhere herein, in series and sealing the PTC devices with an insulator.

Some embodiments relate to automatic temperature controllers for sensing the planar heater overheating prevention sensor cable according to the preceding paragraphs or any other description herein, and controlling a heat-generation amount, based on the sensed result.

Also, some embodiments relate to planar heater heating systems that include, for example, the planar heater overheating prevention sensor cable or the automatic temperature controller according to the preceding paragraphs or any other disclosure herein.

Some embodiments relate to prefabricated heating systems that include for example, the planar heater overheating prevention sensor cable or the automatic temperature controller according to the preceding paragraphs or any other description herein.

BRIEF DESCRIPTION OF THE DRAWINGS

The above and other objects, features and other advantages of the present technology will be more clearly understood from the following detailed description taken in conjunction with the accompanying drawings, in which.

DETAILED DESCRIPTION OF CERTAIN INVENTIVE EMBODIMENTS

Hereinafter, embodiments of the present technology will be described with reference to the annexed drawings in more detail.

Any crystalline polyolefin resins known in the art may be used for manufacturing PTC devices of the present technology. In particular, it is preferable to use one or more resins selected from ethylene butyl acrylate copolymers, ethylene vinyl acetate copolymers and polyethylene oxide. More specifically, it is preferable to use a polymer resin which is suitable for 40 to 120° C. of an optimum temperature of an overheating prevention sensor of a planar heater and increases resistance in accordance with an increasing temperature within a relatively narrow temperature range. Preferably, the amount of the resin used is preferably 20 to 70 parts by weight. When the content of the polymer resin is less than 20 parts by weight, the compounding and molding of PTC devices is difficult. When the content exceeds 70 parts by weight, the conductivity of PTC devices is disadvantageously increased due to relatively low content of conductive filler.

In addition, conductive fillers that can be used in the present technology are preferably one or more carbon blacks having a mean particle diameter of 70 to 300 nm. The selection of carbon black exhibiting superior PTC performance is realized taking into consideration the fact that carbon black exhibits great PTC intensity, as carbon black has a large particle size and a relatively low surface area. Carbon black having a mean particle diameter less than 70 nm exhibits superior conductivity at room temperature, but has insufficient PTC intensity. Carbon black having a mean particle diameter of 300 nm or higher exhibits superior PTC intensity, but exhibits deteriorated conductivity at room temperature, thus not being preferable. The amount of carbon black used is preferably 30 to 80 parts by weight. When the content of carbon black is less than 30 parts by weight, the conductivity at room temperature may be insufficient, and when the content exceeds 80 parts by weight, compounding and molding may be difficult due to relatively low content of the polymer resin and is thus not preferable.

The additive may be selected from antioxidants, UV stabilizers, cross-linking agents and combinations thereof. Any additive may be used without particular limitation so long as it is commonly used in the art. Specifically, examples of antioxidants that can be used in the present technology are Irganox® as a phenol-based antioxidant and Ultranox® and Richnox as phosphorus-based antioxidants, and examples of UV stabilizers that can be used in the present invention include Tinuvin®, Chimassob and the like and useful cross-linking agents are Dicumyl peroxide, etc. Useful additives include one or more selected from antioxidants, UV stabilizers, cross-linking agents and combinations thereof. The amount of additive used may be, for example, within the range of 0.1 to 3 parts by weight. When the content is 3 parts by weight or higher, conductivity at room temperature of the PTC device is high and PTC intensity is decreased, which is not preferable.

Preferably, the compounding of the PTC device according to the present technology may be carried out at a temperature at least 20° C. higher than a melting temperature of polymer resin used. When the compounding temperature is lower than a melting point, mixing of the conductive filler with the polymer resin is insufficient. When the compounding temperature is excessively high, variations in characteristics may be caused by thermal decomposition of the polymer resin.

Preferably, the PTC device may be manufactured by adhering an electrode (metal plate) to both sides of the compounded conductive composition within the melting temperature range of the polymer resin and compressing the resulting electrode structure into a sheet with a thickness of 0.2 to 3 mm. When the thickness is smaller than 0.2 mm, molding is difficult, and when the thickness exceeds 3 mm, resistance at room temperature is high due to large electrode distance and is not thus preferable. It is preferable to use metal plates (copper, aluminum, stainless steel, etc.) well-known in the art having low resistance and high oxidation-resistance.

Then, by reinforcing strength and durability of the resin and removing a negative temperature coefficient (NTC) phenomenon at the melting point or higher, thereby realizing a stable PTC phenomenon, a cross-linking process to vary inner bonding state of the polymer resin is performed. The cross-linking process entails irradiation of electron beams which can prevent the NTC phenomenon caused by re-aggregation of carbon black at the melting point or higher by forming a physical cross-linking structure in the polymer resin. Preferably, the irradiation of electron beams is carried out at 5 to 320 keV. When electron beams are irradiated at a level less than 5 keV, cross-linking of the polymer resin is insufficient and reproducibility of PTC decreases, and when electron beams are irradiated at a level exceeding 320 keV, problems such as thermal decomposition of the polymer resin and decrease in PTC intensity occur.

In addition, after electron beam cross-linking or manufacturing of overheating prevention sensor cables, annealing may be further performed. The PTC device is subjected to thermal shock in the manufacture thereof. In order to impart stable PTC performance to final PTC devices, the PTC devices are subjected to an annealing process to maintain the PTC device at a temperature less than the melting point of the polymer resin for a long time and thereby to offset thermal stress, and improve PTC properties.

Figure 13:
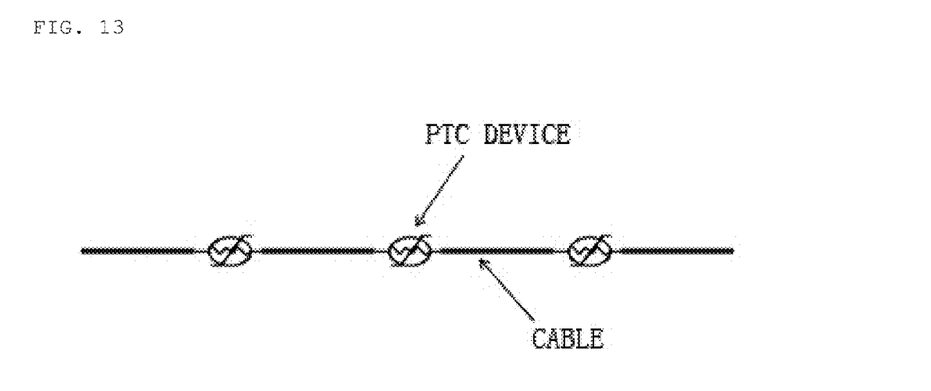
FIG. 13 is a plan view schematically illustrating an overheating prevention sensor cable using a PTC device.

As shown in FIG. 13, the overheating prevention sensor cable using PTC devices is fabricated by soldering a plurality of PTC devices at a predetermined distance or connecting the PTC devices in series using a connector. The PTC devices are finishing-treated with an insulator and sealed to protect against physical shock and humidity.

The insulator is made of a mix resin selected from epoxy resins, urethane resins, silicon resins, polyester resins, melamine resins, ethylene vinyl acetate and combinations thereof. Preferably, insulators which exhibit superior impact resistance and prevent humidity permeation are used to protect against physical shock.

Figure 14:
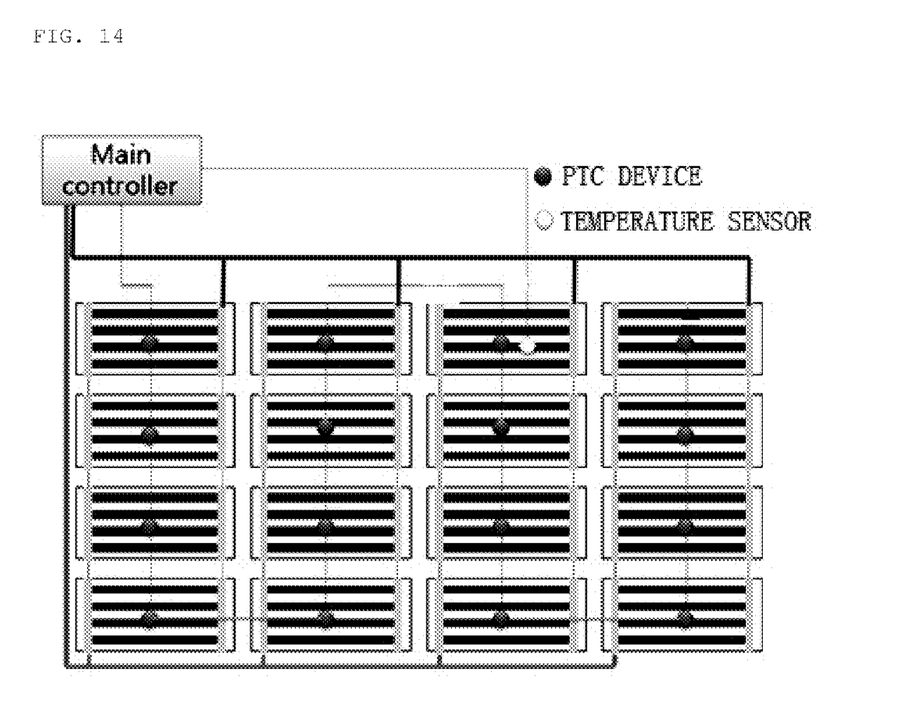
FIG. 14 is a schematic view illustrating a mono-channel control circuit in which a PTC overheating prevention sensor cable is arranged in a planar heater.
Figure 15:
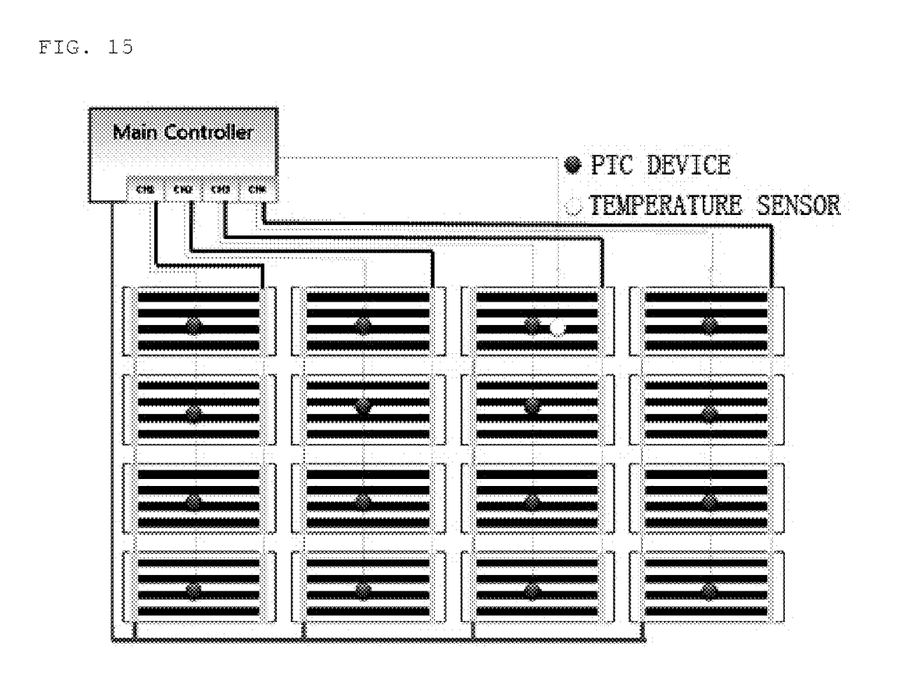
FIG. 15 is a schematic view illustrating a multi-channel control circuit in which a PTC overheating prevention sensor cable is arranged in a planar heater.

The overheating prevention sensor cable has a structure in which several to hundreds of PTC devices are connected in series in the form of a cable. As shown in FIGS. 14 and 15, the cable is cut to a predetermined length in a region in which a planar heater is arranged, and may thus be bent in one direction. The cable has a structure in which PTC devices are adhered in a zigzag form on the entire surface of the planar heater and PTC devices are randomly dispersed in the form of a dot. Although varied depending on use conditions, at least one PTC device is preferably arranged in a unit area ($m^2$).

The present invention relates to an automatic temperature controller comprising a temperature sensor to heat a heater to a predetermined temperature, an overheating prevention sensor cable using a PTC device to prevent overheating upon abnormal operation and a control unit to control a power of the planar heater through signals input from the sensors (temperature sensor and overheating prevention sensor cable) and a method for operating the same.

Figure 16:
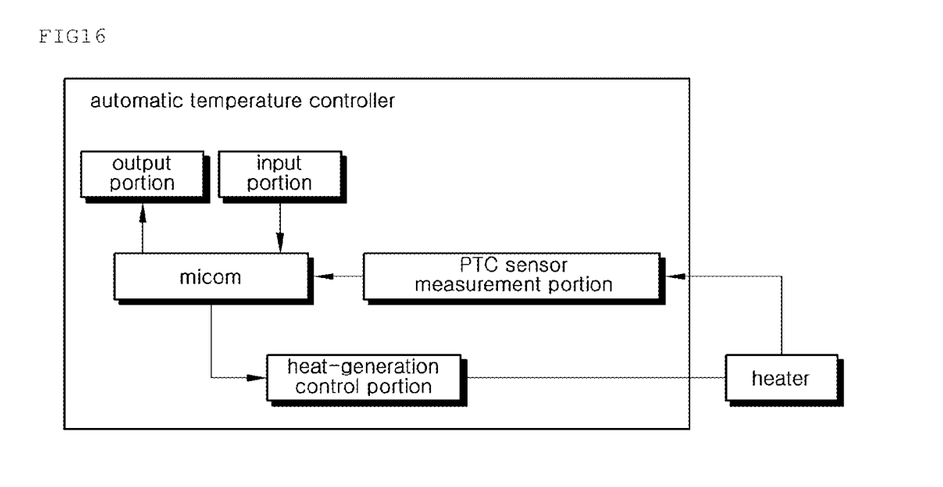
FIG. 16 is a diagram showing the configuration of the automatic temperature controller according to the present technology.

FIG. 16 is a diagram showing the configuration of the automatic temperature controller according to the present technology. The automatic temperature controller comprises an input/output portion, a micom, a heater control portion and a PTC sensor measurement portion. The input portion transfers a predetermined temperature from a user to the micom, and the output portion informs the user of a present heating temperature supplied from the micom. A basic operation mechanism is as follows. When a power of the automatic temperature controller is applied and a user inputs a set temperature, the micom controls the control portion to apply power, when the heating temperature sensed by the temperature sensor is lower than the set temperature, and the micom controls the control portion to block power and thereby control the heater, when the heating temperature is higher than the set temperature.

Figure 17:
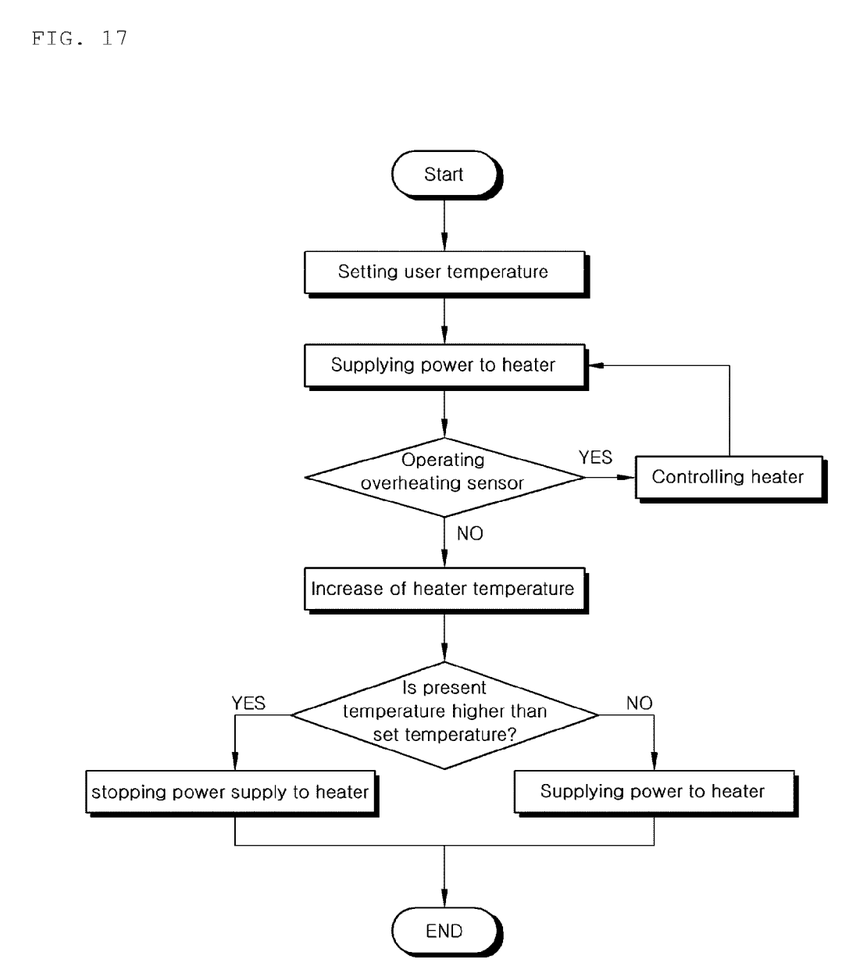
FIG. 17 is a flow chart illustrating an automatic temperature control method according to one embodiment.

The PTC sensor measurement portion periodically senses the overheating prevention sensor cable and thus controls the heater control portion when overheating occurs due to abnormal operation. FIG. 17 shows a flow chart illustrating the afore-mentioned automatic temperature control method according to one embodiment.

For the planar heater overheating prevention system using the PTC device according to the present technology, a maximum application area depends on the capacity of the automatic temperature controller. Accordingly, the overheating prevention system may be a mono-channel system composed of one channel (FIG. 14) or a multi-channel overheating prevention system which is partitioned into predetermined portions (FIG. 15) depending on the construction area. The overheating prevention system may be provided with a circuit to block electric current in order to rapidly sense partial overheating and momentarily control overheating in the corresponding channel, thus enabling control of only the overheated region, without affecting the overall heating system.

EXAMPLES

Now, the present technology will be described in more detail with reference to the following Examples. These examples are provided only for illustrating some embodiments of the present technology and should not be construed as limiting the scope and spirit of the present invention.

Examples 1 to 8

PTC devices were manufactured in accordance with formulations and conditions as set forth in Table 1 below:

TABLE 1

|  |  | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Crystalline polymer resin | Resin 1 | 35 | 40 |  |  |  |  |  |  |
|  | Resin 2 |  |  | 20 | 30 |  |  |  |  |
|  | Resin 3 |  |  |  |  | 30 | 50 |  |  |
|  | Resin 4 |  |  |  |  |  |  | 35 | 70 |
| Carbon black | CB1 | 64.5 |  | 80 |  | 69.5 |  | 64.5 |  |
|  | CB2 |  | 59.5 |  | 69.5 |  | 49 |  | 30 |
| Antioxidant |  | 0.5 |  |  | 0.5 |  | 0.5 | 0.5 |  |
| UV stabilizer |  |  | 0.5 |  |  | 0.5 |  |  |  |
| Cross-linking agent |  |  |  |  |  |  | 0.5 |  |  |
| Total (g) |  | 100.0 | 100.0 | 100.0 | 100.0 | 100.0 | 100.0 | 100.0 | 100.0 |
| Electrode molding |  | Thickness: 3 mm | | Thickness: 2 mm | | Thickness: 1 mm | | Thickness: 0.2 mm | |
| Specimen size |  | 5 mm * 10 mm | | | | | | | |
| Electron beam cross-linking |  | 5~320 keV irradiation | | | | | | | |
| Annealing |  |  |  |  |  |  |  | (60° C., 12 hr) |  |

Resin 1: ethylene butyl acrylate copolymers
Resin 2: ethylene vinyl acetate copolymers
Resin 3: ethylene vinyl acetate copolymers
Resin 4: polyethylene oxide
CB1: particle size of 300 nm
CB2: particle size of 70 nm
Antioxidant: Richnox
UV Stabilizer: Chimassob
Cross-linking agent: Dicumyl peroxide The characteristics of the manufactured PTC devices are as follows. FIGS. 1 to 8 show physical properties of PTC devices according to electron beam cross-linking intensity. As shown in FIGS. 1 to 8, a 3-dimensional network structure is formed in a PTC device at 20 keV or higher, thereby blocking transfer of carbon black and stabilizing PTC behaviors. As a result, an NTC phenomenon is not observed.

Figure 1:
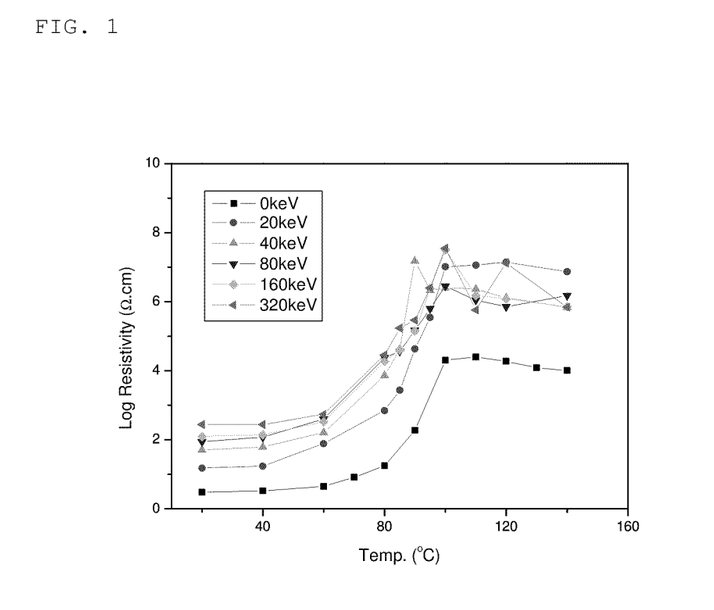
FIG. 1 is a graph showing characteristics of a PTC device according to an electron beam irradiation amount in Example 1.
Figure 2:
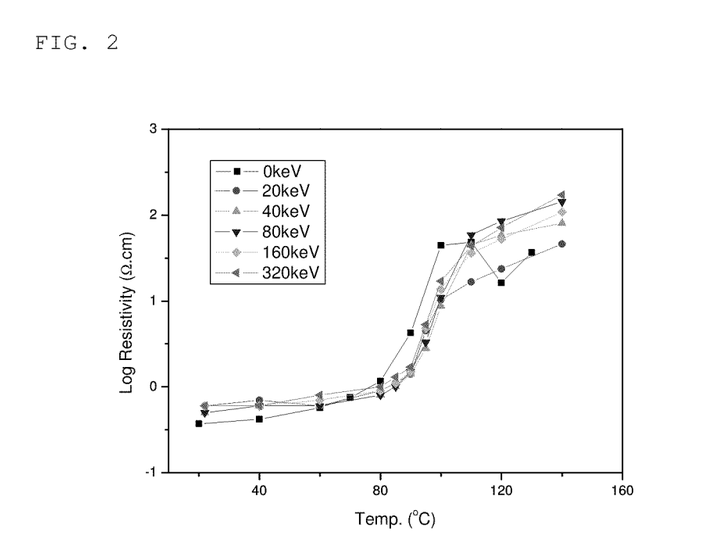
FIG. 2 is a graph showing characteristics of a PTC device according to an electron beam irradiation amount in Example 2.
Figure 3:
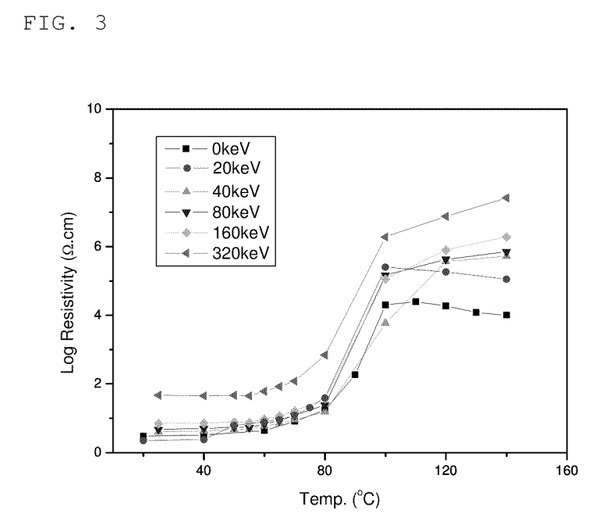
FIG. 3 is a graph showing characteristics of a PTC device according to an electron beam irradiation amount in Example 3.
Figure 4:
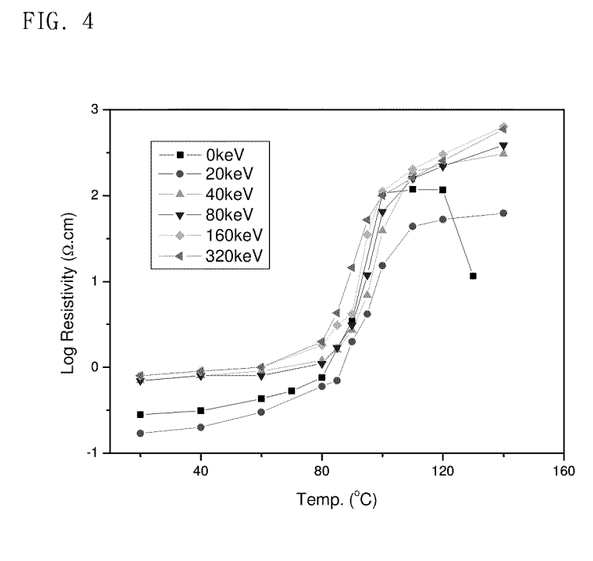
FIG. 4 is a graph showing characteristics of a PTC device according to an electron beam irradiation amount in Example 4.
Figure 5:
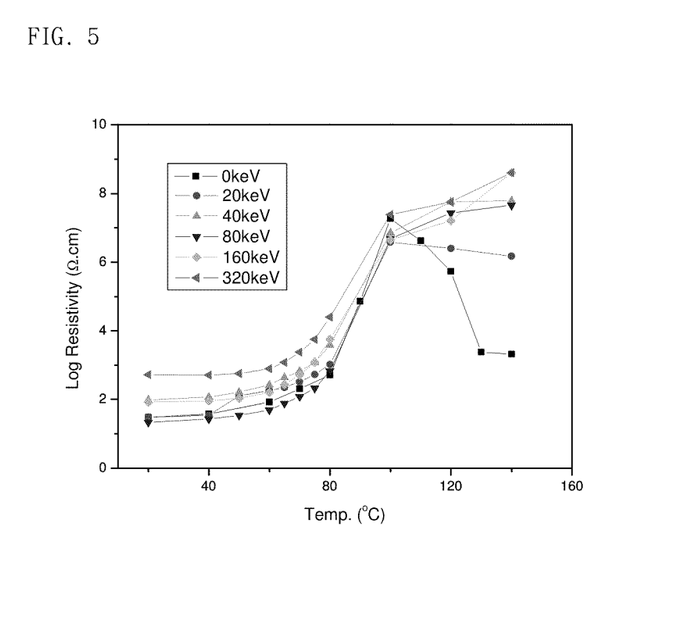
FIG. 5 is a graph showing characteristics of a PTC device according to an electron beam irradiation amount in Example 5.
Figure 6:
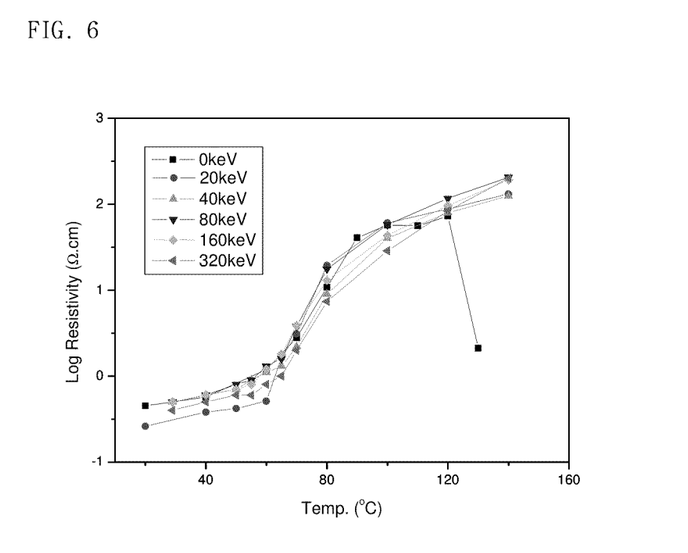
FIG. 6 is a graph showing characteristics of a PTC device according to an electron beam irradiation amount in Example 6.
Figure 7:
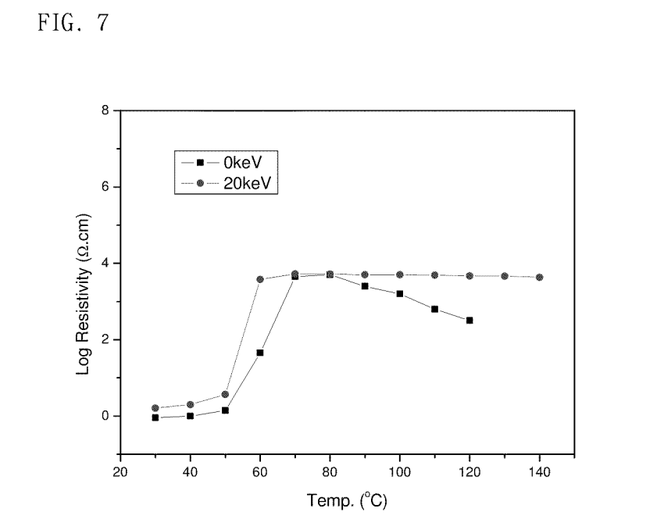
FIG. 7 is a graph showing characteristics of a PTC device according to an electron beam irradiation amount in Example 7.
Figure 8:
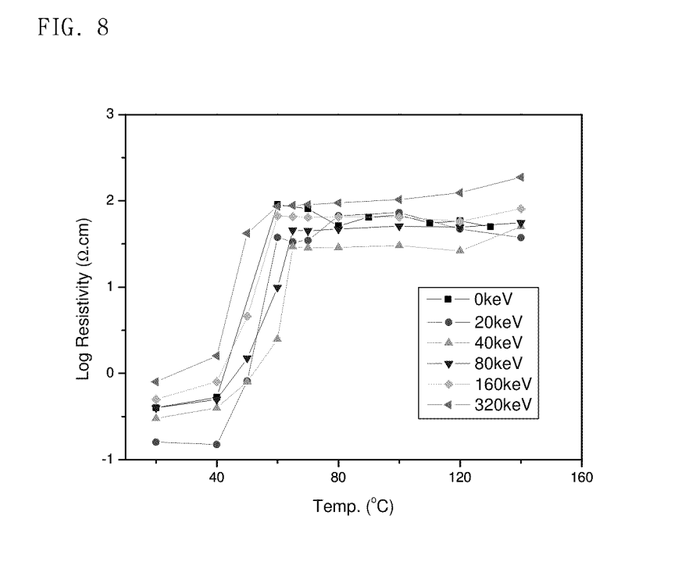
FIG. 8 is a graph showing characteristics of a PTC device according to an electron beam irradiation amount in Example 8.
Figure 9:
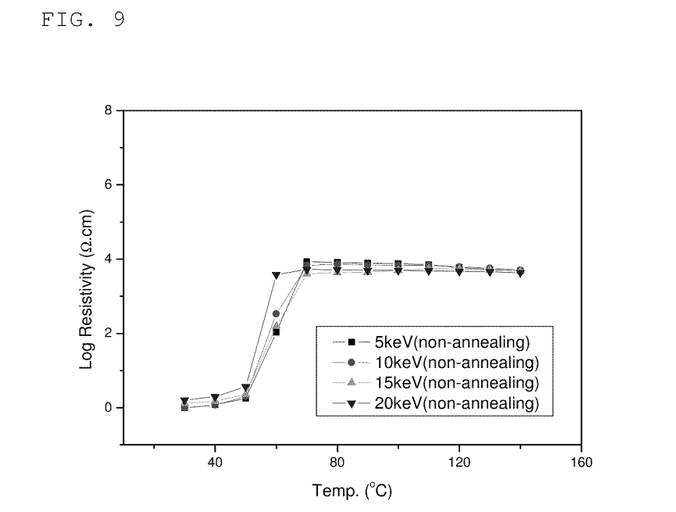
FIG. 9 is a graph showing characteristics of a PTC device in Example 7 before annealing.
Figure 10:
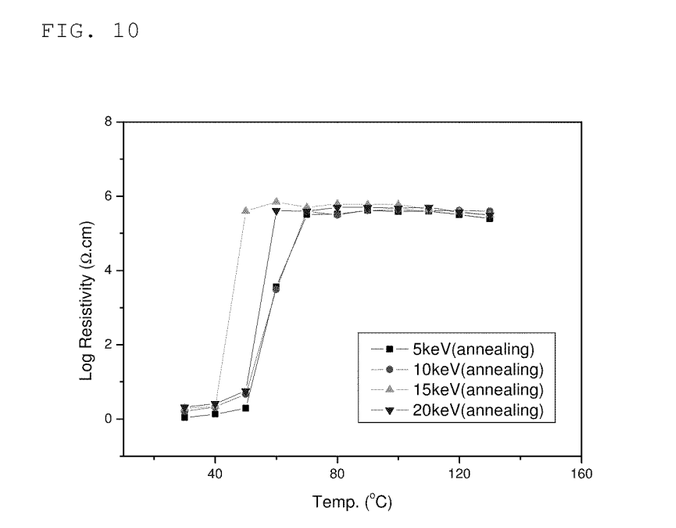
FIG. 10 is a graph showing characteristics of a PTC device after annealing for 12 hours at 60° C.

FIGS. 9 and 10 are graphs showing variation in PTC properties by annealing. Tests for thermal shock and stress applied upon adherence of lead lines are carried out by annealing for 12 hours at a melting temperature or less of the resin.

The property variations of PTC devices caused by annealing are shown in FIGS. 9 and 10. As shown in FIGS. 9 and 10, initial resistance variation is not great at room temperature, but PTC resistance and intensity are greatly increased as much as 100 fold.

Figure 11:
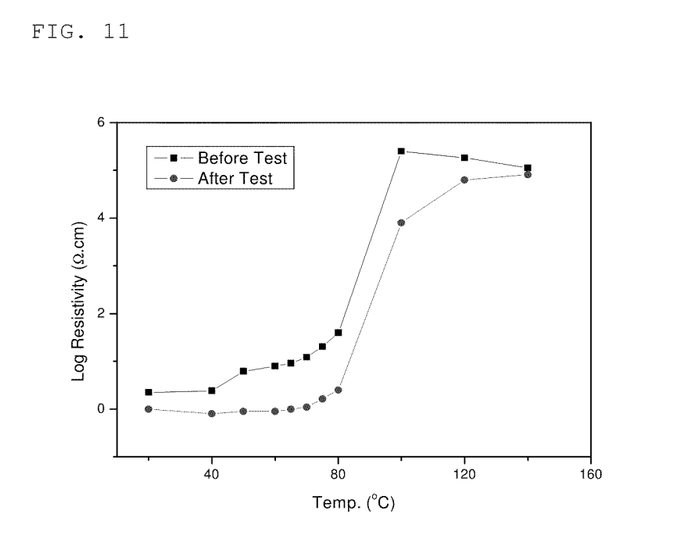
FIG. 11 is a graph showing reproducibility of a PTC device after electron beam irradiation at 20 keV in Example 3.
Figure 12:
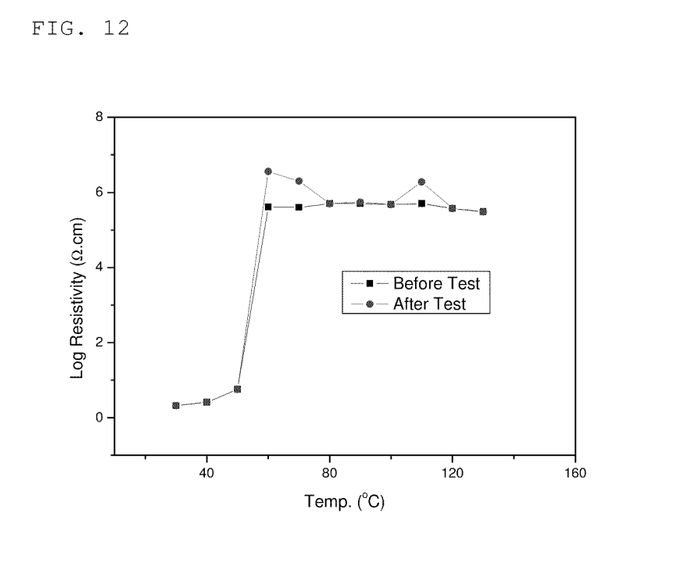
FIG. 12 is a graph showing reproducibility of a PTC device after electron beam irradiation at 20 keV in Example 7.

Next, reproducibility of PTC devices was tested. The reproducibility tests were carried out using temperature variation tests (30° C., 10 min ↔ 90° C., 10 min, 100 cycles). As can be seen from FIGS. 11 and 12, PTC intensity of $10^4$ or higher is maintained at PTC operation temperatures of 60° C. and 100° C.

Example 9

A floor heating system using a planar heater was realized. A construction plane with a bottom area of 2×2 m and a consumption power of 850 W was structured as shown in FIG. 14 and a heat-blocking material (blanket) with a weight of about 2 Kg and a size of 1×1.5 m was placed on the construction plane to realize intentional heat storage and verify the overheating prevention system. The results thus obtained are shown in the drawings.

Figure 18:
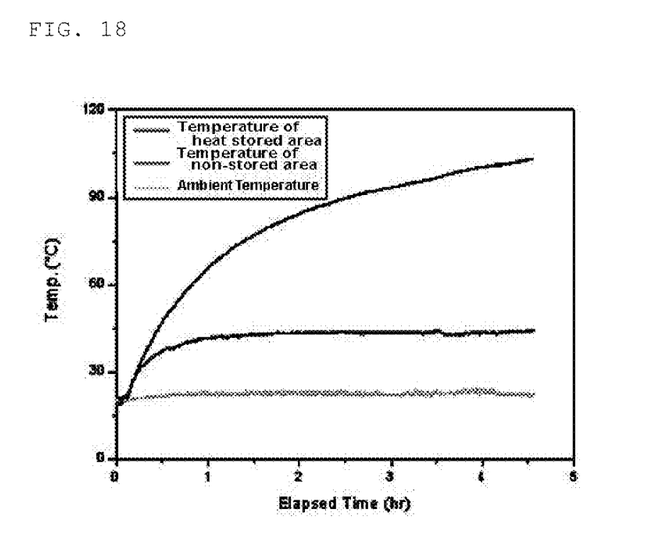
FIG. 18 is a graph showing heat storage of a heating system according to a conventional automatic temperature controller.
Figure 19:
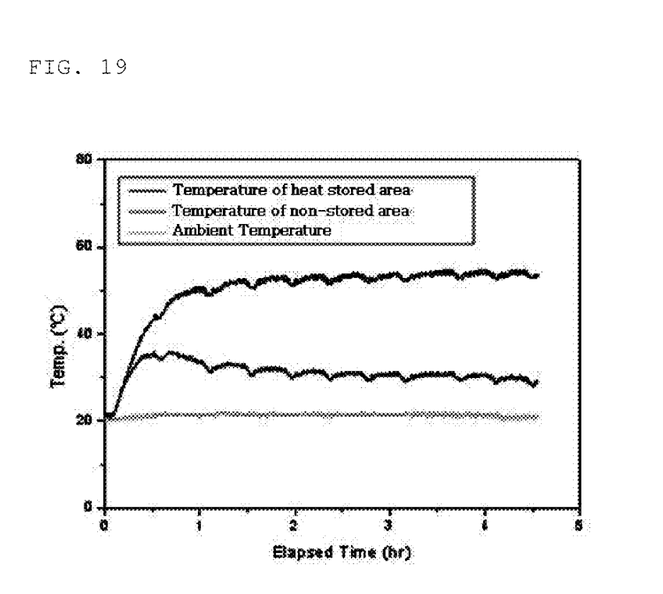
FIG. 19 is a graph showing a heat-storage of a heating system using a system for preventing overheating of a planar heater, to which an overheating prevention sensor cable using the PTC device of Example 7 is applied.

FIG. 18 is a graph verifying heat storage in a region to which a temperature sensor is not adhered, in the case in which a conventional automatic temperature controller is adhered, and FIG. 19 is a graph to verify heat storage in a region to which a temperature sensor is not adhered, in the case in which four PTC devices of Example 7 are arranged in a unit area ($m^2$) using a temperature sensor and an overheating prevention sensor cable manufactured according to the present invention.

As can be seen from the graphs, for the planar heater overheating prevention system using the PTC device of the present technology, the temperature of the heat-stored finishing material is maintained at 50 to 55° C. and safety is superior, while, for the conventional automatic temperature controllers, heat is gradually stored and the temperature of the heat-stored region is thus elevated to 100° C. after test periods.

As apparent from the foregoing, the present technology enables manufacture of PTC devices which exhibit PTC characteristics at a temperature of 40 to 120° C. suitable for the planar heater overheating prevention sensor, and have superior resistance at room temperature, PTC intensity and PTC reproducibility, and provides a system for preventing overheating of a planar heater which can prevent overheating (or heat storage) of the planar heater and exhibits improved safety using the PTC device as an overheating prevention sensor.

Although the preferred embodiments of the present technology have been disclosed for illustrative purposes, those skilled in the art will appreciate that various modifications, additions and substitutions are possible, without departing from the scope and spirit of the technology as disclosed in the accompanying claims.

What is claimed is:

1. A method for manufacturing a positive temperature coefficient (PTC) device, the method comprising:
   a) mixing one or more polymer resins selected from ethylene butyl acrylate copolymers, ethylene vinyl acetate copolymers and polyethylene oxide, carbon black having a mean particle diameter of 70 to 300 nm and an additive to prepare a compounding composition, wherein the additive is a mixture comprising an antioxidant, a UV stabilizer and a cross-linking agent;
   b) adhering an electrode to both surfaces of the compounding composition and compressing the resulting electrode structure into a sheet; and
   c) forming a PTC device whose operating temperature is 60 to 100° C. and whose intensity is more than $10^4$ ohm cm by irradiating electron beams to the sheet to perform cross-linking.

2. The method according to claim 1, wherein the compounding composition comprises the polymer resin of 20 to 70 wt %, the carbon black of 30 to 80 wt % and the additive of 0.1 to 3 wt %.

3. The method according to claim 1, wherein the sheet formed into the electrode in step (b) has a thickness of 0.2 to 3 mm.

4. The method according to claim 1, wherein, in step c), the electron beam cross-linking process is carried out at 5 to 320 keV.

5. The method according to claim 1, further comprising: annealing after cross-linking or manufacturing the overheating prevention sensor cable.

6. The method according to claim 2, further comprising: annealing after cross-linking or manufacturing the overheating prevention sensor cable.

7. The method according to claim 3, further comprising: annealing after cross-linking or manufacturing the overheating prevention sensor cable.

8. The method according to claim 4, further comprising: annealing after cross-linking or manufacturing the overheating prevention sensor cable.

9. A planar heater overheating prevention sensor cable comprising: a plurality of PTC devices connected in series and an insulator for sealing the PTC devices wherein said PTC devices have been manufactured using a process comprising:
   a mixing one or more polymer resins selected from ethylene butyl acrylate copolymers, ethylene vinyl acetate copolymers and polyethylene oxide, carbon black hag a mean particle diameter of 70 to 300 nm and an additive to prepare a compounding composition, wherein the additive is a mixture comprising an antioxidant, a UV stabilizer and a cross-linking agent;
   b) adhering an electrode to both surfaces of the compounding composition and compressing the resulting electrode structure into a sheet; and
   c) forming a PTC device whose operating temperature is 60 to 100° C. and whose intensity is more than $10^4$ ohm cm by irradiating electron beams to the sheet to perform cross-linking.

* * * * *

UNITED STATES PATENT AND TRADEMARK OFFICE
CERTIFICATE OF CORRECTION

PATENT NO. : 8,716,633 B2  
APPLICATION NO. : 12/872874  
DATED : May 6, 2014  
INVENTOR(S) : Suk-Hwan Kang Page 1 of 1

It is certified that error appears in the above-identified patent and that said Letters Patent is hereby corrected as shown below:

On the Title Page, item [30] Foreign Application Priority Data,

Column 1, line 17, change "Feb. 10, 2010" to -- Feb. 16, 2010 --

Signed and Sealed this  
Twenty-second Day of July, 2014

Michelle K. Lee  
*Deputy Director of the United States Patent and Trademark Office*